United States Patent
Banaei et al.

(10) Patent No.: US 10,921,502 B2
(45) Date of Patent: Feb. 16, 2021

(54) EYEWEAR ARTICLE WITH INTERFERENCE FILTER

(71) Applicant: EVERIX, INC., Orlando, FL (US)

(72) Inventors: Esmaeil Banaei, Orlando, FL (US); Craig Royden Nelson, Melbourne, FL (US)

(73) Assignee: Everix, Inc., Orlando, FL (US)

( * ) Notice: Subject to any disclaimer, the term of this patent is extended or adjusted under 35 U.S.C. 154(b) by 20 days.

(21) Appl. No.: 16/092,756

(22) PCT Filed: Apr. 13, 2017

(86) PCT No.: PCT/US2017/027340
§ 371 (c)(1),
(2) Date: Oct. 10, 2018

(87) PCT Pub. No.: WO2017/180828
PCT Pub. Date: Oct. 19, 2017

(65) Prior Publication Data
US 2019/0121006 A1    Apr. 25, 2019

Related U.S. Application Data

(60) Provisional application No. 62/321,808, filed on Apr. 13, 2016.

(51) Int. Cl.
*G02B 5/20* (2006.01)
*G02B 5/28* (2006.01)
(Continued)

(52) U.S. Cl.
CPC ............... *G02B 5/28* (2013.01); *G02C 1/10* (2013.01); *G02C 7/107* (2013.01); *G02C 9/00* (2013.01); *G02F 1/133509* (2013.01)

(58) Field of Classification Search
CPC ........ G02B 5/28; G02B 5/0891; G02B 5/208; G02B 5/281; G02B 5/282; G02B 5/283;
(Continued)

(56) References Cited

U.S. PATENT DOCUMENTS 5,796,461 A * 8/1998 Stepan .................... A61F 9/025
351/106
6,601,954 B2 * 8/2003 Menon ...................... G02C 1/06
351/41

(Continued)

FOREIGN PATENT DOCUMENTS

DE           102 12 961 A1    10/2003
DE    10 2013 106 201 A1    12/2014

OTHER PUBLICATIONS

International Search Report with Written Opinion, International Application No. PCT/US2017/027340, dated Aug. 22, 2017, 14 pgs.

(Continued)

*Primary Examiner* — William R Alexander
*Assistant Examiner* — Henry A Duong
(74) *Attorney, Agent, or Firm* — Brinks Gilson & Lione

(57) ABSTRACT

An eyewear article for wearing outside of the human eye includes a flexible, transparent interference filter film with a multi-layer structure, wherein the interference filter film includes at least one filter layer with a layer thickness dimensioned to reduce a transmission of light of a selected range of wavelengths by optical interference. The interference filter film may have a static cling surface configured for removable attachment to a lens surface or an attachment layer affixed to the interference filter film for temporary or permanent attachment to a lens surface, for example by adhesion. The interference filter film may alternatively be bonded to an optical lens or form a separate structure for mechanical or magnetic mounting on eyeglasses.

23 Claims, 6 Drawing Sheets

(51) Int. Cl.
  *G02C 1/00* (2006.01)
  *G02C 7/10* (2006.01)
  *G02C 9/00* (2006.01)
  *G02F 1/1335* (2006.01)
(58) Field of Classification Search
  CPC .............. G02B 19/0042; G02B 19/009; G02B 19/0095; G02F 1/133509; G02C 1/10; G02C 7/107; G02C 9/00; B29D 11/0073; B29D 11/00009
  USPC ........................................................ 359/359
  See application file for complete search history.

(56) References Cited

U.S. PATENT DOCUMENTS

| 7,452,069 | B2* | 11/2008 | Lipawsky | G02C 9/04 |
| | | | | 351/47 |
| 2007/0070494 | A1 | 3/2007 | Brott et al. | |
| 2008/0314499 | A1* | 12/2008 | Begon | B29C 63/0073 |
| | | | | 156/64 |
| 2013/0141693 | A1* | 6/2013 | McCabe | B29C 45/14819 |
| | | | | 351/159.56 |
| 2013/0194538 | A1* | 8/2013 | Junkins | G02C 9/04 |
| | | | | 351/47 |
| 2014/0009827 | A1* | 1/2014 | Simon | H04N 13/334 |
| | | | | 359/464 |
| 2015/0146166 | A1* | 5/2015 | Weber | G02C 7/107 |
| | | | | 351/159.62 |

OTHER PUBLICATIONS

European Search Report for related application No. EP 17783106.2, dated Feb. 20, 2017, 14 pgs.
International Preliminary Report On Patentbility for Application No. PCT/2018/045489, dated Feb. 11, 2020, 8 pgs.

* cited by examiner

EYEWEAR ARTICLE WITH INTERFERENCE FILTER

RELATED APPLICATIONS

This application claims priority to PCT/US2017/027340, filed Apr. 13, 2017, which claims the benefit of U.S. Provisional Application No. 62/321,808, filed Apr. 13, 2016.

TECHNICAL FIELD

The present application relates to an eyewear article for wearing outside of the human eye, for being attached to or formed by eyeglasses or goggles. The term eyewear article means that it is placed in the field of vision, not that it is necessarily self-supported.

BACKGROUND

There are various needs for manipulating light spectrum to enhance human vision experience, to protect the vision system, or to control subsequences of light interaction with human's vision system.

The simplest example of an eyewear article manipulating a transmitted light spectrum is found in sunglasses that filter light to reduce intensity for eye comfort. Black or dark grey sunglasses are neutral density filters that dim the light intensity almost equally across the wide visible light spectrum range. Colored eyewear with various color hues are also filters that partially discriminate between various parts of the light spectrum and filter more of certain portions than other portions of the light spectrum.

A second example is digital eye strain that stems from intense blue light radiation from modern digital displays. Eyewear lenses that reduce blue light typically relieve eyestrain and contribute to maintaining healthier eyes. Macular degeneration is also found to develop faster by exposure to blue and UV light. While exposure to intense sunlight is known to expedite macular degeneration, it is believed that prolonged exposure to the lower-intensity blue light from digital displays may leave human eyes with similar damages.

A third example is increasing color contrast for athletes. For instance, golf players more precisely and easily spot golf ball at distance when their eyewear lens filters green to create higher contrast with golf ball.

A forth example is assisting colorblind eyes to see colors to some extent. Colorblind people have defective retinal cells with overlapping spectral sensitivity curves that cause more than one type of cell to detect light signal. As a result, the brain cannot distinguish the color since multiple cone or rod cells transmit signal simultaneously. Filtering light in the portions of the light spectrum with sensitivity overlap increases the ability to distinguish colors.

A fifth example is related to migraine headache which is proven to worsen or start with exposure to light in 85% of migraine sufferers. Scientific research has revealed that this sensitivity to light is significantly higher in certain portions of the visible light spectrum than other portions. A filter that attenuates those higher-sensitivity spectral ranges has shown to reduce the risk of migraine attack.

A sixth example is protection against lasers and other intense light sources in medical or industrial operations.

A seventh example is related to increased viewability of modern LED displays in high ambient light environments.

An eighth example is the use of different light filters on the two lenses of eyewear for 3D display and cinema applications.

A ninth example is sleep disruption caused by a small portion of the light spectrum that changes our melatonin production to an unhealthy level at night. This can be filtered.

The traditional and most common way of light filtering for eyewear is pigmentation of lens plastic or glass materials. The optical lenses are tinted with a dye that is opaque for certain wavelengths of light. This approach is inexpensive and efficient for many purposes. There are disadvantages to this approach though. Organic or inorganic pigments typically block light through absorption. This imposes two limits:

1) A significant portion of the light energy that is absorbed by the pigment material converts into heat in the plastic or glass lens material which instead melts or damages the optical lens. This is particularly an issue for laser protection eyewear.

2) A vast majority of absorptive pigment materials offer relatively wide absorption spectra with shallow transition from high to low absorption. In other words, peripheral ranges of the absorption spectrum that provide for partial transmission of light are rather wide and do not provide a sharp cut-off. The absorption spectrum has shallow flanks so that wide ranges of wavelengths are partially transmitted. While this is desirable for applications such as consumer sunglasses, it is a major drawback for several others. Most light filtering applications either necessarily need or can benefit from a higher level of selectivity of blocked and transmitted wavelengths by providing narrower blocking range and sharper transition from high to low transmission.

For instance, the range of wavelengths that causes an unhealthy change in melatonin hormone level resulting in sleep disruption is very narrow. The range of wavelengths from 460 nm through 480 nm is the most harmful range. However, pigmented materials do not have such a narrow absorption band to only block this range. They absorb a much wider spectral band and therefore unnecessarily distort colors and reduce visibility of features in neighboring wavelengths.

In the case of migraine headache triggered by light, two narrow parts of the light spectrum are found to be major triggers. However, pigmented lens materials cannot block only those ranges without significant blocking of other ranges. Therefore, migraine sufferers have no better option but wearing dark sunglasses indoor and outdoor to reduce their risk.

SUMMARY OF THE INVENTION

The present application discloses an eyewear article for wearing outside of the human eye, with a flexible, interference filter film with a multi-layer structure, wherein the interference filter film includes at least one filter layer with a layer thickness dimensioned to reduce a transmission of light of a selected range of wavelengths by optical interference. The interference filter film may be a multi-layer coated structure customizable to any spectral shape with high degrees of selectivity. Thin-film coatings are multi-layer stacks of optical materials with thicknesses smaller than wavelength of light to be filtered. These coatings manipulate light spectrum through interference effects as opposed to absorption which is the blocking mechanism in pigments.

The interference filter film may have a surface with static-cling properties that allows for temporary and removable adhesion to an eyeglass lens.

Alternatively, an attachment layer affixed to the interference filter film allows for attaching the interference filter film to a lens of a pair of eyeglasses. The attachment layer may be on the outer surface for attaching the interference filter film to the flat or concave inner surface of the optical lens, i.e. on the side facing the eye. Alternatively, the attachment layer may be located on the inner surface of the interference filter film for attachment to the outside surface of an eyeglass lens. The attachment layer may be in the form of an adhesive that is activated by light, pressure or heat. Alternatively, the attachment layer may be a cling film for removable attachment.

Opposite the surface proximate the eyeglass lens, the interference filter film may be coated with a coating for scratch protection from physical damage or with anti-reflective properties against glare.

According to another aspect of the present invention, the interference filter film may be permanently affixed to an eyeglass lens. Because the interference filter film can be separately manufactured, it can be applied to a finished lens, thereby reducing inventory requirements. Finished bare lenses may be equipped with a custom interference filter film, depending on the intended use, without requiring expensive coating equipment at the location where the eyeglasses are assembled. This allows for cost-effective and fast pairing of corrective lenses with a custom interference filter film without requiring stocking of many different corrective lenses with many different optical filters. Again, the interference filter may be attached on the concave inside or on the convex outside of the corrective lens.

The interference film may be affixed by a permanent adhesive or by material bonding without an intermediate adhesive layer.

For removable filter films, a space between two optical lenses may operate as an insertion slot for the interference filter film so that no adhesion is required at all. Alternatively, the two optical lenses may be manually separable from each other so that the interference filter film can be placed and held between the two lenses.

In further developments, the interference filter film may include mechanical or magnetic attachment features cooperating with eyeglasses, or a frame for increased stability.

Further details and benefits of the present invention will become apparent from a description of the attached drawings. The drawings are included herewith solely for illustrative purposes and are not intended to limit the scope of the present invention.

DETAILED DESCRIPTION

Figure 1:
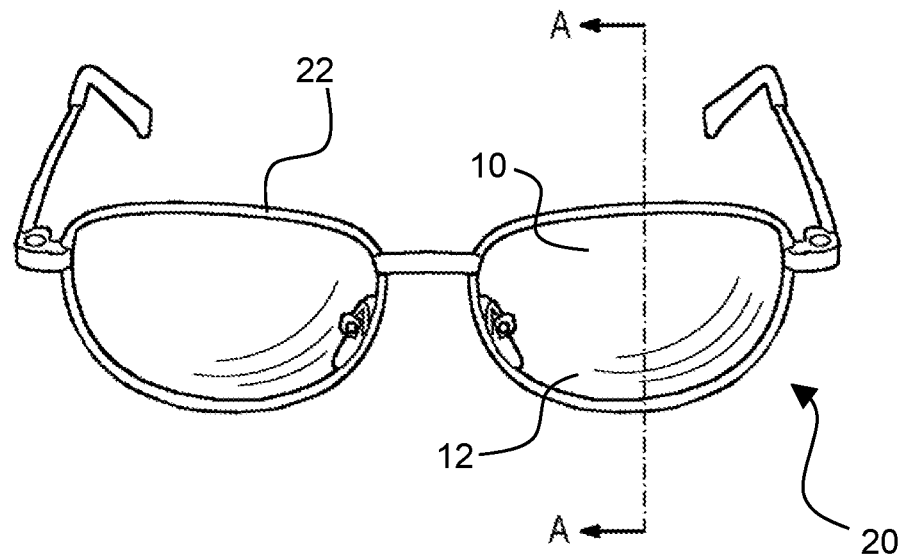
FIG. 1 shows a pair of eyeglasses with an interference filter film according to the present invention.

Interference thin-film coatings and filters are used in several industries from telecommunication to medical and consumer electronics, but rarely in products requiring large surface areas at low cost. The reason is that the processes involved in producing thin film filters is highly expensive. As a result, thin-film filters have not found many applications in mainstream consumer eyewear markets either.

Aside from military-grade eyewear with less cost constraints, interference thin film coatings are used in two general areas in the eyewear industry:

Anti-reflective (anti-glare) coatings—These coatings typically have one or only a few layers of coating to create high-quality anti-reflection. Similar coatings are also engineered to partially reflect blue light for eyestrain and macular degeneration mitigation. The coating technologies have matured to a point that such simple coatings are very affordable at high volumes involved in eyewear market.

Laser protection—A class of laser protection goggles also use thin-film coatings with up to approximately 60 coating layers to achieve high blocking levels without absorption that cause the optical lens material to melt or degrade. These goggles are, however, very expensive, only suitable for technical applications.

The aforementioned examples of light filter needs in eyewear and vision applications mostly require several tens and often hundreds of coating layers. Therefore, traditional thin-film coating technologies are cost-prohibitive for consumer-level eyewear.

The interference filter film may be a multi-layer coated structure customizable to any spectral shape with high degrees of selectivity. Thin-film coatings are multi-layer stacks of optical materials with thicknesses smaller than wavelength of light to be filtered. These coatings manipulate light spectrum through interference effects as opposed to absorption which is the blocking mechanism in pigments.

A new methodology for production of high-performance interference thin-film filters has been developed that offers scalability at low cost significantly better than traditional coating. The general method of producing such thin-film filters is described in US20140242329A1. This method paves the way to introduce flexible interference thin-film filters into consumer eyewear markets.

Filter layer thicknesses are determined by the application and the desired spectral specs. The filter layer may vary from being much thinner than typical adhesive layers to comparable thickness, and in rare situations to a greater thickness than the adhesive layers. Adhesives are usually sold in various thicknesses depending on how much strength is needed. For the intermediate adhesive layers (in the construction of the stack including protective layers) thicker adhesives may be better, so the layers do not easily come apart. But for a final adhesive layer that makes the interference filter film adhere to the exterior of eyeglass lenses, a weak, thin adhesive may be better (unless permanent adhesion is desired). Adhesives are usually from 1 mil (25 microns) to 5 mils (125 microns). The interference filter film 10 itself may have a thickness from less than 25 microns, even 10 microns, to hundreds of microns, up to 1 mm.

Interference filters produced by this method of thermal drawing are in the form of thin, flexible films or sheets comprising of several sub-wavelength-thick layers of optical materials causing interference light reflection. Therefore, traditional vacuum coating processes are not feasible for applying this type of interference filter to eyewear lenses.

This disclosure proposes various methods of applying thin-film interference films to eyewear.

For example, the domed shape of the interference filer film can be achieved by controlled drawing of a material into sheet form. A preform comprising at least one material includes all layers and layer thickness proportions that will be present in the interference filter film, albeit at a greater absolute thickness than in the final film. After passing a furnace, the preform is drawn to increase its length in the drawing direction while decreasing its thickness. This process can be repeated numerous times until the desired thickness is achieved. In a final heating step, the drawn film may be shaped to obtain its domed shape, for example by calibrating the parameters of the drawing process itself, such as local temperature and local drawing speed, or by molding sheets of the resulting filter film to a given surface shape.

In the following description of various embodiments, the flexible multi-layer interference filter film bears reference numeral 10.

Figures 8, 9:
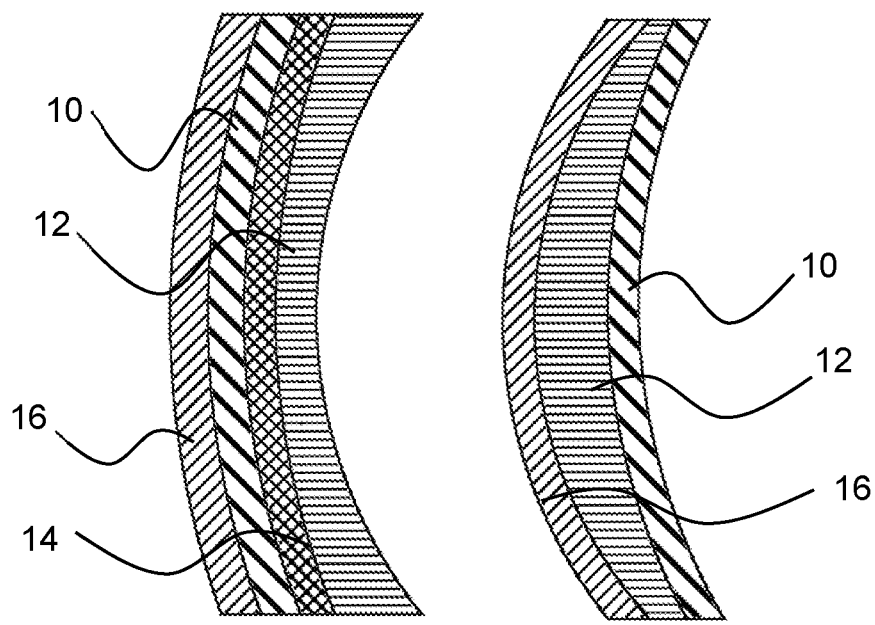
FIG. 8 shows a seventh embodiment of an eyeglass lens with an interference filter film.
FIG. 9 shows an eighth embodiment of an eyeglass lens with an interference filter film.

Reference numeral 12 designates a rigid eyewear lens that, without limitation, is mostly shown as a convex lens for correcting myopia. FIG. 9 shows a lens for correcting hyperopia. The eyewear lens 12 may be made of glass or polycarbonate or any other clear material suitable for optical lenses. These are only examples for illustration. In general, eyeglass lenses are domed with an outer convex surface and an inner concave surface. The term "domed" in this context means that the optical lenses are curved in their two major dimensions. The optical lens surfaces may be shaped like partial spheres, but deviations from the spherical shape for variations of the optical focus are included in the definition of "domed," for example in multifocal, progressive, or astigmatic lenses. The disclosed interference filter film 10 is suited of various multifocal or progressive lenses 12 as well, including those that correct astigmatism.

An adhesive layer, where present, bears reference numeral 14, and a coating bears reference numeral 16. The coating may provide scratch protection or have anti-reflective properties against glare, or both.

A pair of eyeglasses 20 with an interference filter film 10 applied to the optical lenses 12 is shown in FIG. 1. The line A-A designates the cross-sectional plane of FIGS. 2-10, which omit the frame 22 of the eyeglasses for simplicity. The dimensions shown in FIGS. 2-10 are exaggerated in the horizontal direction relative to the vertical direction for better rendering of the thin layers. Furthermore, the individual thicknesses of the various layers and of the optical lenses are not to scale with respect to one another.

Figures 2, 3:
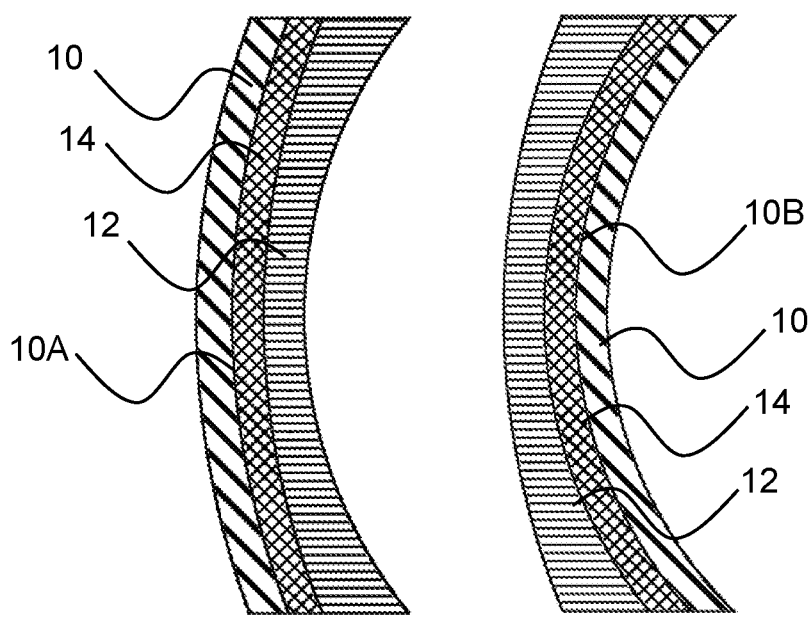
FIG. 2 shows a first embodiment of an eyeglass lens with an interference filter film.
FIG. 3 shows a second embodiment of an eyeglass lens with an interference filter film.
Figure 14:
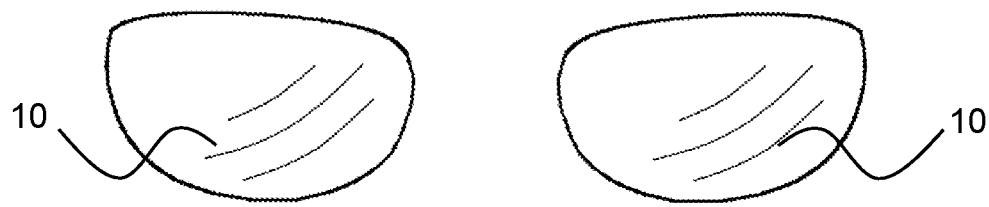
FIG. 14 shows an unframed pair of interference filter films.

FIGS. 2 and 3 show a first and a second embodiment of an Interference filter film 10 attached to an eyewear lens 12 via an adhesive layer 14 applied to the interference filter film 10 for adherence to the optical lens surface. The term "adhesive layer" is used herein to include embodiments with a layer of static cling material so that the adhesive force may be permanent or temporary, meaning that the interference filter film may be removed from the optical lens intact and without damage to the optical lens or the interference filter film. Thus, the interference filter film 10 may be replaceable with a different filter film 10 that blocks a different range of wavelengths and may be reusable. Thus, the interference filter film may be provided in custom-cut domed sheets as shown in FIG. 14.

In the first embodiment of FIG. 2, the adhesive layer 14 is applied to the concave inner surface 10A of the interference filter film 10 for adherence to the outer surface of the optical lens 12. The outer surface of the optical lens is the surface remote from the eye. In the second embodiment of FIG. 3, the adhesive layer 14 is applied to the convex outer surface 10B of the interference filter film 10 for adherence to the inner surface of the optical lens 12.

For example, because the interference filter film 10 can be applied to the outer surface and to the inner surface of the optical lens, it is possible to combine a first interference filter film, for example for a migraine sufferer, with a second interference filter film, for example for blocking blue-spectrum wavelengths from a computer monitor. One of the two films may be applied to the outside surface of the optical lens 12, and the other one to the inside surface. Because the blocked ranges of wavelengths have steep spectral flanks, the application of two interference filter films 10 will not unduly impede the transmission of wavelengths outside the blocked spectral ranges. Alternatively, two or more filter films may be stacked on one surface.

Figures 4, 5:
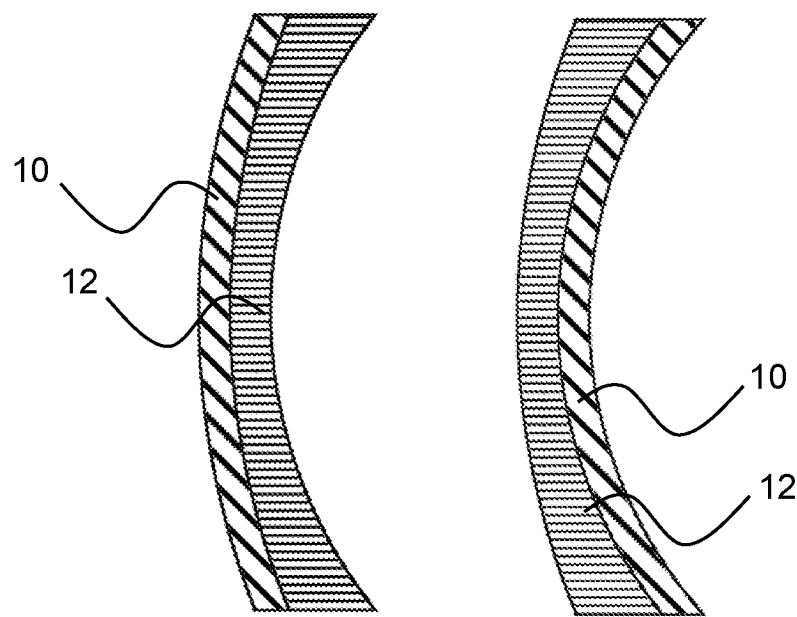
FIG. 4 shows a third embodiment of an eyeglass lens with an interference filter film.
FIG. 5 shows a fourth embodiment of an eyeglass lens with an interference filter film.

FIGS. 4 and 5 show a third and a fourth embodiment, in which the interference filter film 10 is attached to the eyewear lens 12 by thermal bonding or ultrasound bonding on at least peripheries of the overlapping area between the optical lens 12 and the interference filter film 10. As in the first two embodiments, the interference filter film 10 may be applied to the outer surface of the optical lens 12, to the inner surface of the optical lens 12, or to both.

Figures 6, 7:
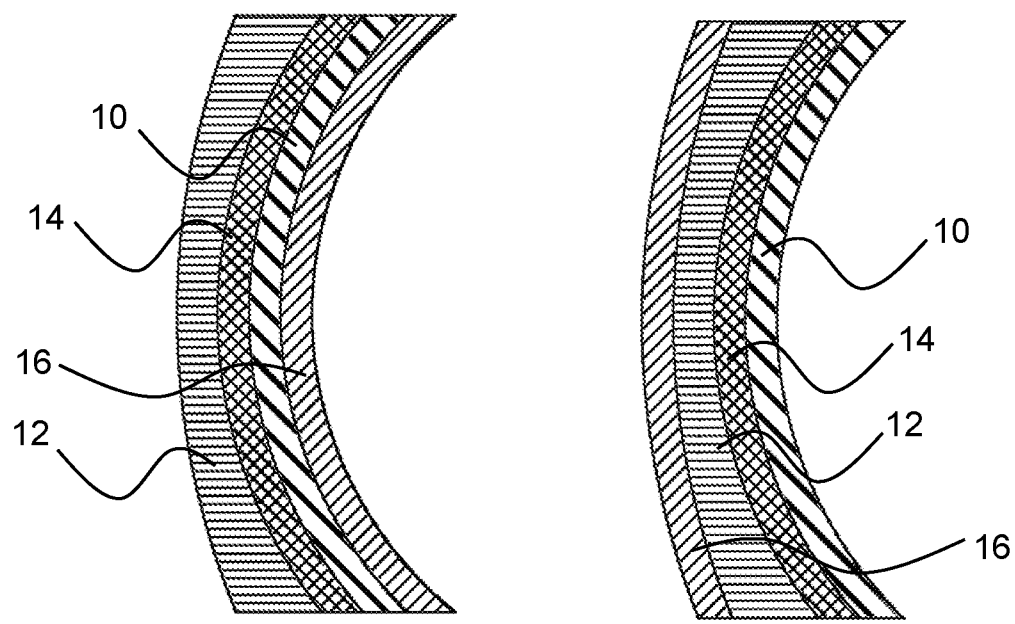
FIG. 6 shows a fifth embodiment of an eyeglass lens with an interference filter film.
FIG. 7 shows a sixth embodiment of an eyeglass lens with an interference filter film.

FIGS. 6, 7, and 8 show variations of an optical lens 12 with an interference filter film 10 and a coating 16. While these embodiments all show an adhesive layer 14, the adhesive layer 14 may be omitted as in FIGS. 4 and 5 without leaving the scope of the present invention. In FIGS. 6 and 8, the coating 16 is applied to the premanufactured interference filter film 10 so that applying the interference filter film 10 to the optical lens 12 will also equip the optical lens 12 with anti-scratch or anti-glare properties. Alternatively, FIG. 7 shows the optical lens 12 having the coating 16 directly applied to the optical lens 12. For pre-coated lenses, it is recommended that the interference filter film 10 is applied on the opposite side of the optical lens 12 because a coating 16 between the optical lens 12 and the interference filter film 10 loses its purpose. Because a coating 16 is typically present on the outer surface of the optical lens, the interference filter film 10 will typically applied to the inner surface of the coated lens 12 as shown in FIG. 7. The interference filter film 10 of FIG. 7 may additionally have its own coating 16 in analogy with FIG. 6 so that the optical lens is scratch-protected or anti-reflective from both sides. Also, as discussed above, the embodiments of FIGS. 6 and 8 may be combined for providing the optical lens 12 with two interference filter films 10 having different properties.

FIG. 9 finally shows an embodiment of an eyewear lens 12 having a coating 16 on its outer surface and a bonded interference filter film 10 on its inner surface.

Figures 10, 11A, 11B:
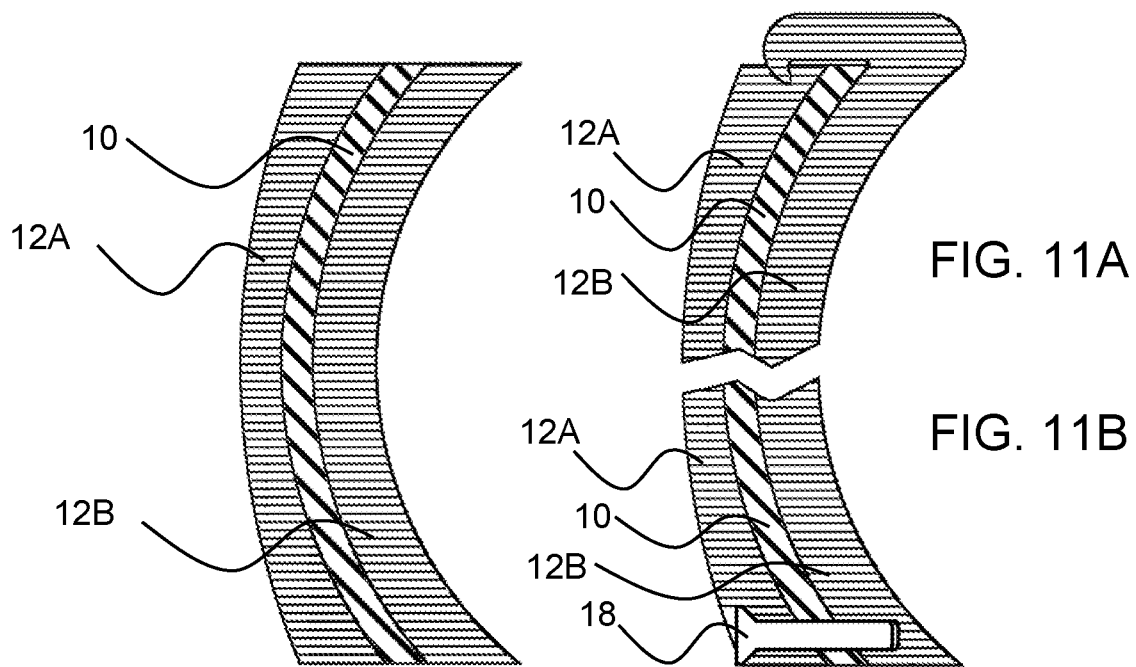
FIG. 10 shows a ninth embodiment of an eyeglass lens with an interference filter film.
FIG. 11A shows a tenth embodiment of an eyeglass lens with an interference filter film.
FIG. 11B shows an eleventh embodiment of an eyeglass lens with an interference filter film.

FIGS. 10, 11A, and 11B show examples of an interference filter film 10 inserted between an outer portion 12A and an inner portion 12B of a two-part lens. The interference filter film 10 may be insertable into a slot formed between the two lens portions 12A and 12B that may be rigidly secured relative to each other, for example via the frame 22 of the eyeglasses. In such devices, a desired interference filter film can be removably inserted into the fixed slot. Alternatively, the two lens portions 12A and 12B can be reversibly secured to each other as separable parts so that the interference filter film is sandwiched between the two lens parts 21A and 12B. In FIG. 11A, the two lens parts 21A and 12 B are snapped onto each other. This is suitable for lens materials with some material elasticity. Alternatively, an elastic material may be molded onto the optical lens edge. Alternatively, a separate fastener 18, for example a threaded bolt, may be used to secure the outer lens portion 12A, the interference filter film 10, and the inner lens portion 12B together.

For faster interchangeability of the interference filter film, a pair of coated or uncoated interference filter films 10 may be premanufactured with their own frame 24 placing the two interference filter films 10 in proper positions relative to each other for removably applying both interference filter films to the eyeglasses 20 at the same time. Connectors 26 formed on the frame may cooperate with the frame 22 of the eyeglasses for mounting the frame 24 on the frame 22. For example, the connectors 26 may be hooks that can be hung over side portions of the frame 22. Alternatively or additionally, the connectors 26 may include a magnet cooperating with a permanent magnet or a ferromagnetic feature on the frame 22.

Figure 12:
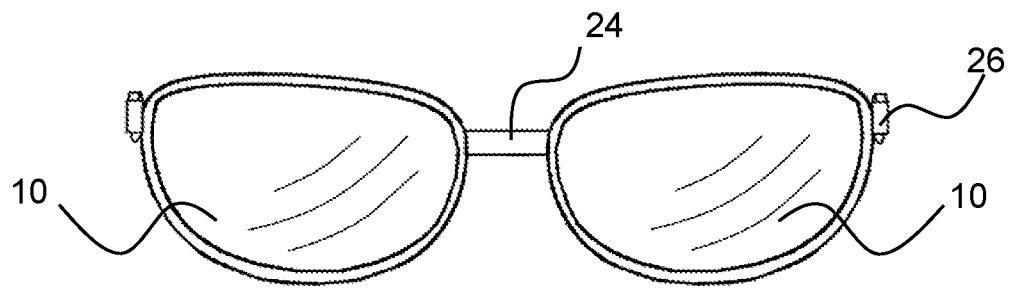
FIG. 12 shows a framed pair of interference filter films.
Figure 13:
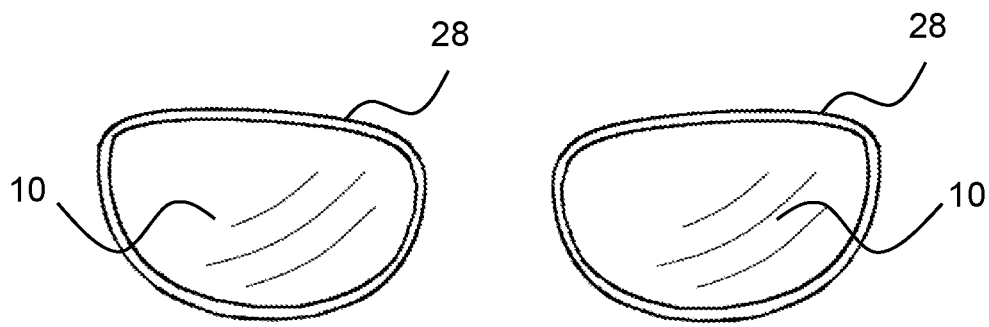
FIG. 13 shows a framed pair of interference filter films in an alternative embodiment.

Each interference filter film 10 may alternatively have its own single frame 28 as shown in FIG. 13. Such a structure may reduce weight compared to the embodiment of FIG. 12. The individual frames may be resilient and suitably shaped for being snapped onto the frame 22 of the eyeglasses. While the eyeglasses 20 as shown in FIG. 1 have framed lenses, the invention is applicable in analogy to frameless eyeglasses as well, which have a nose bridge and ear pieces directly fastened to the optical lenses 12.

Figure 15:
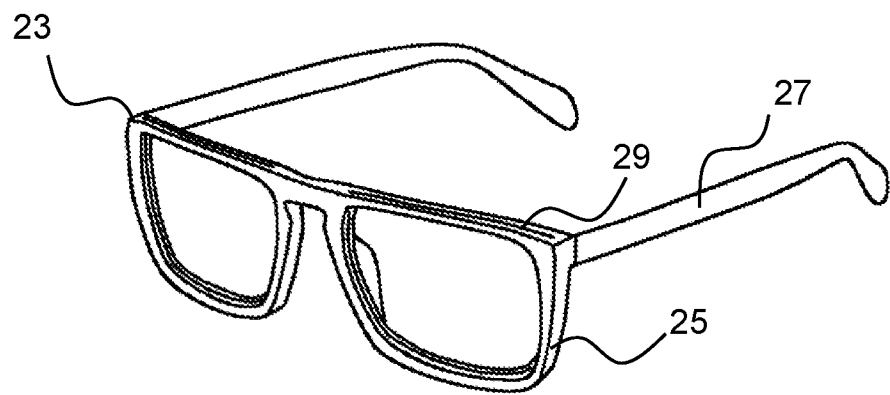
FIG. 15 shows an example of a frame for holding an interference filter film without the need for eyeglasses.

FIG. 15 shows a schematic example of a frame 23 for using the disclosed interference filter film 10 without requiring eyeglasses or goggles. The frame 23 resembles a lens-free eyeglass frame with two connected lens frames 25 and two earpieces 27. The two lens frames 25 are shaped to receive an interference filter film 10 like the ones shown in FIG. 14. In the shown example, the insertion slots are in the upper frame portion of each of the two filter frames 25. Alternatively, the insertions slot may be located on the lateral sides of the filter frames for horizontal insertion, or even at the bottom for upward insertion of the interference filter films. If desired, the interference filter films 10 may be manufactured with a greater stiffness than those films that are attached to a rigid lens. Also, the inserted interference filter films 10 may be flat or domed.

In all the above-mentioned embodiments, the interference filter film may be coated by a layer of hard material either for anti-reflection or for scratch-resistance or both. The hard-coated layer will be the outermost layer exposed to outside, whether it is on the front side of the optical lens or on its rear side.

Eyeglass lenses are typically domed on the inside surface and on the outside surface. Curve radii may range from about 100 mm to about 300 mm. The curve radius or radii in the vertical direction may differ from curve radius or radii in the horizontal direction. Generally, when using a flexible, but planar, interference filter film, applying the interference filter film to an optical lens surface that is planar or has a large curve radius will minimize distortions of the interference filter film.

In the following, various examples are given of methods for applying a flexible filter film to a lens or how to shape a flexible interference filter film prior to applying it to a lens. In the shown examples, additional adhesive layers and coatings have been omitted. It should be noted, however, that any of the above-described embodiments of the interference filter film may be used for the methods described below.

For large curve radii and flat lens surfaces, several methods can be used to apply a planar interference filter film to a lens. The term "planar" in connection with the interference filter film 10 is used to define a relaxed shape without any bending forces exerted on the film.

In a first example, a flexible roller 30 may be used as shown in FIG. 15. The flexibility of the roller may be achieved in using a compressible roller material that adapts its shape to the curvature of the optical lens 12 so that the interference film 10, which in this embodiment preferably includes an adhesive facing the optical lens 12, is pressed against the optical lens 12 as the roller rolls across the optical lens. Additionally, the roller axis of rotation may be resiliently bendable to accommodate the surface of the optical lens. This attachment method is suitable for all lenses, whether they have a concave, convex, planar, or cylindrical surface.

The details of this process may be as follows: The cleaned lens 12 is placed on a soft surface (for example, silicone rubber). The surface of the optical lens 12 to be covered with the interference filter film 10 will face up. The interference filter film 10 may first be laminated with a layer of optical quality adhesive (for example, 3M OCA film, which is an optically clear adhesive). The interference filter film 10 will be brought to close proximity of the surface of the optical lens 12 with the adhesive layer being exposed and facing down. Then the flexible roller 30 that has a soft surface (such as a silicone rubber) will be pressed vertically down to bring the adhesive into contact with the optical lens surface. As the flexible roller rolls over the entire lens area at a steady speed under vertical pressure, the interference filter film 10 is laminated to all parts of the optical lens 12. Finally, any extra film extending beyond the periphery of the optical lens 12 will be cut using one of the many cutting methods (water jet, laser beam or sharp guided blade). The bond between the optical lens and the interference filter film will strengthen as the adhesive cures further.

Figure 16:
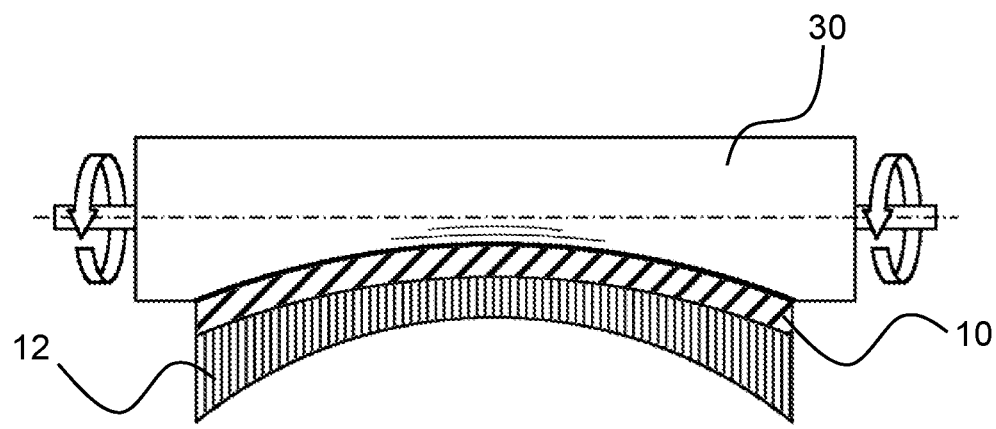
FIG. 16 show a first method of applying an interference filter film to a lens.

In a second example, as shown in FIG. 16, a rubber stamp 32 is shaped to complement the shape of the surface of the optical lens 12 that receives the interference filter film. The rubber stamp 32 is sized to cover the entire lens 12 to press the interference filter film with an adhesive layer against the optical lens. This attachment method is likewise suitable for all lenses, whether they have a concave, convex, planar, or cylindrical surface.

This second example differs from the first example in that instead of rolling a flexible roller 30, a soft stamp 32 that is pre-shaped to the curvature close to that of surface of the optical lens 12 will be vertically pressed down to bring the interference filter film (with exposed adhesive layer facing down) in contact with the optical lens.

Figure 17:
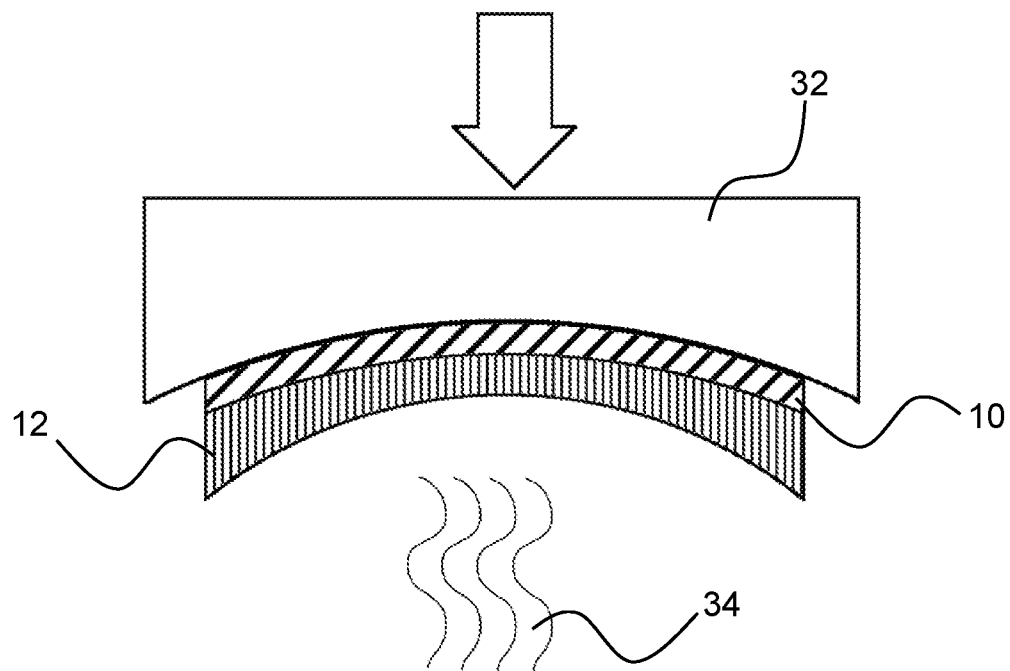
FIG. 17 show a second method of applying an interference filter film to a lens.
Figure 18:
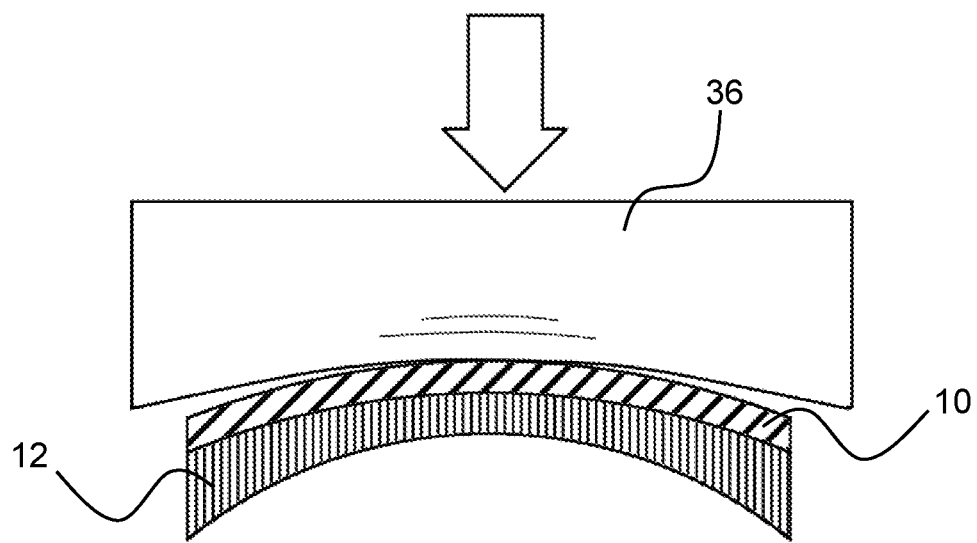
FIG. 18 show a third method of applying an interference filter film to a lens.
Figure 19:
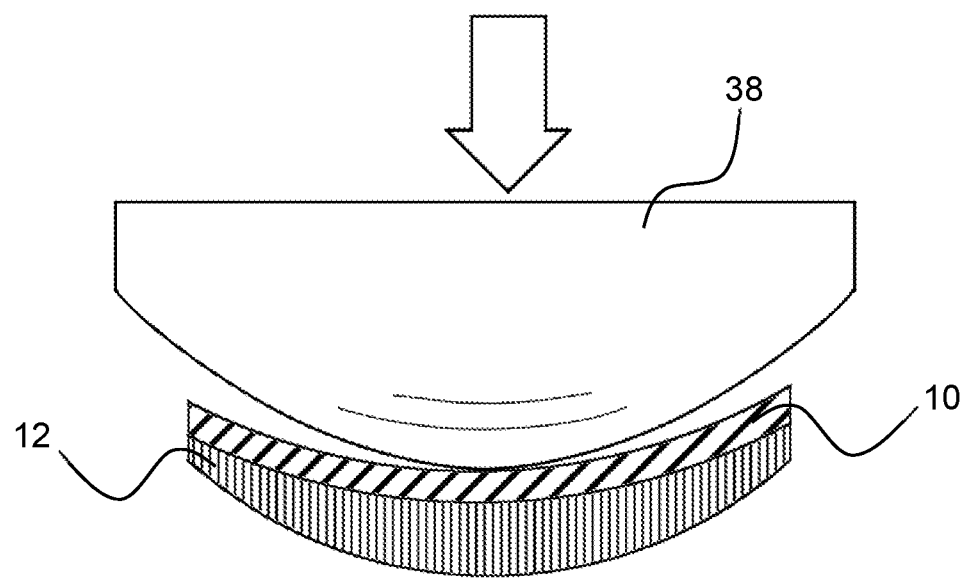
FIG. 19 show a fourth method of applying an interference filter film to a lens

In a third example, illustrated in FIGS. 17 and 18, the rubber stamp 36 or 38 has a curvature radius that allows for affixing the interference filter film 10 to the optical lens 12 from the center of the optical lens 10 radially outward. When applying the interference filter film to a convex surface as shown in FIG. 17 or a cylindrical surface that is convex in only one direction, the rubber stamp 36 is selected to have a concave shape with a larger curve radius than the lens 12. Conversely, when the lens surface is concave as shown in FIG. 18 or flat or a hollow cylindrical surface that is concave in only one direction, the rubber stamp 38 has a convex shape with a smaller curve radius than that of the optical lens 12. Accordingly, when the rubber stamp 36 or 38 is pressed against the optical lens 12, a point close to the center of the optical lens 12 will first form a contact. As the stamp is progressively pressed against the interference filter film 10, the contact area grows outwards until the entire optical lens 12 is covered.

For example, where the interference film is used as an aftermarket product and sold separately from the optical lens, or where the curvature of the optical lens has a small curve radius that makes attaching a planar film difficult, the interference filter film 10 can be pre-shaped into the domed shape.

Initially, a film is formed by controlled drawing of a material into sheet form. A preform comprising at least one material includes all layers and layer thickness proportions that will be present in the interference filter film, albeit at a greater absolute thickness than in the final film. After passing a furnace, the preform is drawn to increase its length in the drawing direction while decreasing its thickness. This process can be repeated numerous times until the desired thickness is achieved.

In a final heating step, the drawn film may be shaped to obtain its domed shape, for example by calibrating the parameters of the drawing process itself, such as local temperature and local drawing speed. Alternatively, sheets of the resulting interference filter film 10 may be molded into a given surface shape. The latter process is symbolically shown in FIG. 16, where heat 34 is applied while the interference filter film is pressed into the desired shape of the optical lens 12. If the optical lens 12 is replaced with a die, the interference filter film can be removed and stored separately, for example in configurations shown in FIGS. 12-14.

Alternatively, without using a pressing stamp, the interference filter film 10 and the optical lens 12 can be slightly warmed to a point close to a softening temperature of the interference filter film material that is preferably chosen to have a softening temperature low enough that the heat does not affect the optical properties of the optical lens 12. Over a period of time, gravity and/or surface tension will shape the interference filter film 10 to adapt to and adhere to the surface of the optical lens 12, and the two surfaces form a chemical bond by cross-linking polymer chains. This method is applicable to domed surfaces and cylindrical surfaces alike.

While the above description generally discusses adhesive layers, the adhesive layer of all embodiments may be replaced by using a drop of a UV-curable optical adhesive placed between the interference filter film 10 and the optical lens 12 at the time of affixing the interference filter film 10 to the optical lens 12. Then the interference filter film 10 can be pressed against the optical lens 12 or shaped as described above, and an intense UV light source can subsequently be used to illuminate the optical lens 12 from the other side (or through the interference filter film 10, if transparent), to cure the adhesive.

While the above description constitutes the preferred embodiments of the present invention, it will be appreciated that the invention is susceptible to modification, variation and change without departing from the proper scope and fair meaning of the accompanying claims.

What is claimed is:

1. An eyewear article for wearing outside of a human eye, the eyewear article comprising:
   a flexible interference filter film having a multi-layer structure and the interference filter film including at least one filter layer with a layer thickness dimensioned to reduce a transmission of light of a selected range of wavelengths by optical interference; and
   a rigid optical lens, to which the interference filter film is affixed;
   wherein the rigid optical lens is a first optical lens, further comprising a second rigid optical lens in a nested arrangement with the first optical lens, wherein a space between the first and second optical lenses forms a slot configured for receiving the interference filter film.

2. The eyewear article of claim 1, wherein the interference filter film has a planar relaxed shape.

3. The eyewear article of claim 2, wherein the interference filter film has a static cling surface configured for removable attachment to a lens surface.

4. The eyewear article of claim 1, further comprising an attachment layer affixed to the interference filter film.

5. The eyewear article of claim 4, wherein the interference filter film has a domed shape with a convex outer surface and a concave inner surface.

6. The eyewear article of claim 5, wherein the attachment layer is affixed to the convex outer surface.

7. The eyewear article of claim 5, wherein the attachment layer is affixed to the concave inner surface.

8. The eyewear article of claim 4, further comprising a scratch resistant coating on a surface opposite the attachment layer.

9. The eyewear article of claim 1, wherein the interference filter film has a domed shape with a convex outer surface and a concave inner surface and the inner concave surface of the interference filter film is affixed to a convex outer surface of the optical lens.

10. The eyewear article of claim 1, wherein the interference filter film is affixed to the optical lens via an adhesive layer.

11. The eyewear article of claim 1, wherein the interference filter film is affixed to the optical lens via material bonding.

12. The eyewear article of claim 1, wherein the first and second optical lenses are spaced apart by an air gap, wherein the interference filter film is removably insertable into the air gap.

13. The eyewear article of claim 1, wherein the first and second optical lenses are reversibly attachable to each other with the interference filter film being removably held between the first and second optical lenses.

14. The eyewear article of claim 1, further comprising a surrounding frame configured for attachment to eyeglasses.

15. The eyewear article of claim 1, wherein the interference filter film is a first interference filter film, further comprising a second interference filter film connected to the first interference filter film via a nose bridge.

16. The eyewear article of claim 1, further comprising an attachment structure for attachment to eyeglasses.

17. The eyewear article of claim 16, wherein the attachment structure is configured for mechanical attachment to the eyeglasses.

18. The eyewear article of claim 16, wherein the attachment structure is configured for magnetic attachment to the eyeglasses.

19. The eyewear article of claim 1, further comprising a lens-free frame with two earpieces and two filter frames, each of which surrounds a lens-free window, wherein each of the two filter frames includes an insertion slot for receiving one of the interference filter film.

20. The eyewear article of claim 19, wherein the insertion slot is in an upper frame portion of each of the two filter frames.

21. A method of manufacturing an eyewear article to be worn outside of a human eye, the method comprising the following steps:
   forming a flexible multilayer interference filter film; and
   shaping the multilayer interference film complementary to a surface of an optical lens;
   wherein the step of shaping is carried out by pressing the filter film onto the lens with a compressible tool; and
   the compressible tool is a flexible roller and the filter is pressed onto the lens by rolling the roller across the filter film.

22. The method of claim 21, comprising an intermediate step of applying an adhesive to one surface of at least one of the filter film and an optical lens, placing the filter film on the optical lens with the adhesive being between the filter film and the optical lens.

23. The method of claim 21, further comprising the step of placing the filter film on a domed surface, wherein the step of shaping is carried out by heating the filter film to a softening temperature for a sufficient length of time for the filter film to adapt to the domed surface.

* * * * *